Sept. 20, 1960 B. H. CUMMINGS 2,953,155
STORAGE OF STYRENE
Filed May 2, 1958
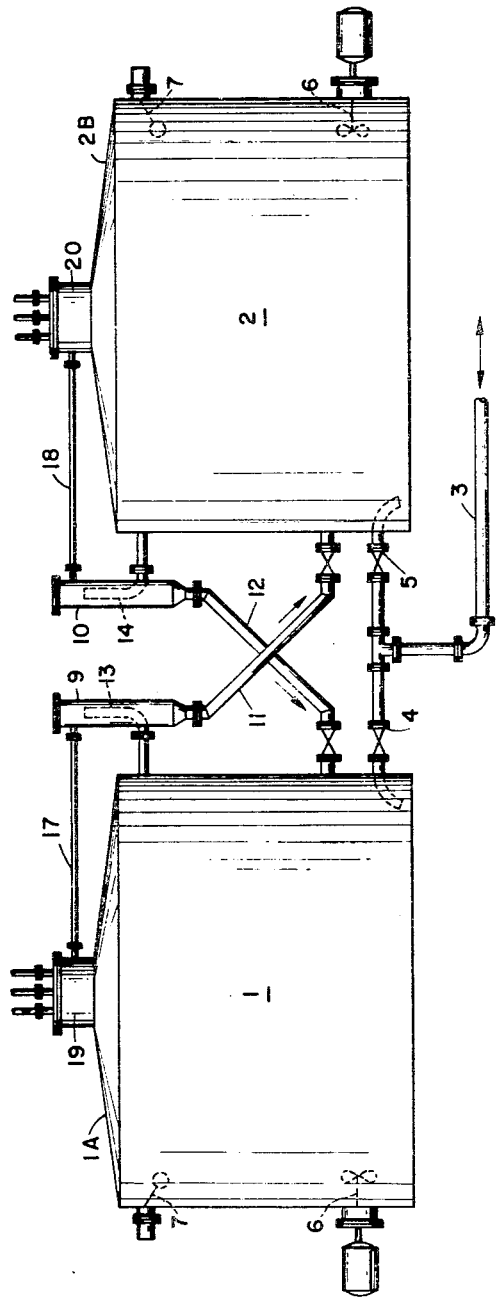
INVENTOR.
B. H. CUMMINGS
BY: H. D. Birch
HIS ATTORNEY

# United States Patent Office 2,953,155
Patented Sept. 20, 1960

2,953,155
STORAGE OF STYRENE

Benjamin H. Cummings, Suffern, N.Y., assignor to Shell Oil Company, New York, N.Y., a corporation of Delaware Filed May 2, 1958, Ser. No. 732,627

1 Claim. (Cl. 137—256)

This invention relates to the storage of styrene and deals particularly with the storage of monomeric styrene in such a manner that oxidation of styrene by reason of exposure to air is prevented.

In the commercial utilization of styrene it frequently becomes necessary to store monomeric styrene for considerable periods of time. The styrene is usually stored in large tanks from which shipment is periodically made. As a consequence, the level of styrene monomer fluctuates within the tank or tanks and accordingly the styrene becomes exposed to the air and polymerization takes place causing the product to be off specification. To remedy this situation an inhibitor is often incorporated in the styrene. Inhibitors sometimes used for this purpose are amines such as beta naphthylamine, or catechols such as tertiary butyl catechol. These inhibitors serve to prevent the polymerization of styrene monomer which is left on the inside wall of the tank upon a lowering of the level of liquid in the tank.

In many cases, with a sufficiently high temperature condition, styrene monomer in the tank vaporizes (without its inhibitor) from the surface and condenses on the upper walls and roof of the tank. Here polymerization takes place and large deposits of polymerized styrene result. This condition requires that the tanks be periodically cleaned at considerable expense as the polymerized material is difficult to remove and to dispose of. The subsequent raising of the liquid level in the tank results in some of the polymerized material becoming dissolved in the monomeric styrene.

It is therefore an object of my inveniton to devise a method by which deterioration of styrene in storage can be prevented.

Another object of my invention is to provide a tank construction for the storage of styrene monomer. Another object of my invention is to provide a storage system whereby the formation of oxidation products in stored polymerizable material is prevented.

The further objects of my invention will be apparent from the description of the invention which follows.

In general terms the invention comprises the provision of tankage means for styrene which is kept periodically completely filled with styrene monomer.

The invention will be more clearly understood by reference to the accompanying drawing which shows two styrene storage tanks and associated equipment in elevation. Referring to the drawing, 1 and 2 are two tanks of equal capacity. These tanks are provided with a common filling and emptying conduit 3 leading to a suitable pumping means (not shown). Valves 4 and 5 near the bottom of the tanks 1 and 2 are provided for controlling the flow to and from the respective tanks. Each tank is provided with a mixer 6 and the usual safety devices such as pressure-vacuum breakers and flame arresters. The tanks are also provided with liquid level gauges 7 of the type which sound an alarm when a certain liquid level is reached in a tank. The tanks 1 and 2 are provided with cone roofs 1a and 2b of relatively flat slope, for example ½" per foot. The tanks are designed so that there is a minimum amount of internal bracing and piping. The roof rafters to this end may be mounted on the outside of the cone roofs.

Connected to each tank and mounted in close proximity to the uppermost section of the vertical side wall of each tank and the cone roof are cylindrical conically bottomed-closed vessels or surge chambers 9 and 10. The vessel 9 has a bottom outlet having a connected conduit 11 offset from the vertical axis which leads into the tank 2 in its lower part. The vessel 10 has a bottom outlet having a connected conduit 12 offset from the vertical axis which leads into the tank 1 in its lower part.

Riser pipes 13 and 14 are fitted into each of the vessels 9 and 10. The riser pipes terminate inside the vessels in outlets which are so located that they are slightly above the peaks of the roofs of the respective tanks 1 and 2. The lower end of each riser pipe emerges through the side wall of each vessel. The riser pipes are connected to the tanks 1 and 2 by suitable piping as shown. Vapor lines 17 and 18 from domes 19 and 20 of the tanks 1 and 2 are connected to the upper side walls of the vessels 9 and 10. In operating the storage system, the styrene monomer is pumped or otherwise caused to flow into the first tank 1 through conduit 3 by closing valve 5 and opening valve 4. The pumping is continued until the tank is full whereupon styrene will be discharged from the outlet of riser pipe 13 into the vessel 9. From 9 the styrene will flow by gravity into the bottom tank 2 by way of conduit 11. When delivery to a tanker vessel or other receiver is required, the styrene is withdrawn (by pumping means or gravity flow) from the full tank 1 first, and, if necessary, from the tank 2 by means of pipe 3. By offsetting the conduits 11 and 12 from the vertical, the free falling of the material overflowing from a tank is reduced and thereby the possibility of aeration or development of static electrical charges reduced.

During the time interval between first withdrawal from the storage and the second withdrawal, the styrene production is pumped into tank 2 through line 3 by closing valve 4 and opening valve 5 until tank 2 is full and overflows through the outlet end of riser 14 into vessel 10. Styrene, collecting in the vessel 10, flows by gravity into the bottom of tank 1 by way of conduit 12. After the next tanker shipment the pumping is again made into tank 1 as above set forth.

In a typical installation utilizing my invention, two tanks of 25,000 barrels capacity are used. At the time of tanker shipment the inventory consists of from 35,000 to 40,000 barrels.

By the arrangement set forth, the styrene longest in storage is always withdrawn first.

By the system described, it will also be seen that the time for styrene to vaporize from the contents of a tank and deposit polymerized material in the upper part and roof of a tank is greatly reduced. By alternately completely filling the tanks and overflowing one tank into the other any deposited material on the walls and roof of the tanks is removed, obviating the cleaning of the tanks and at the same time ensuring that the styrene delivered is up to specification.

While I have described my invention in relation to the prevention of polymerization of styrene in storage, it should be understood that the invention can be applied to the storage of other liquids which tend to become polymerized in storage.

I claim as my invention:

An apparatus for the storage of styrene comprising in combination a first closed top storage tank, a first surge chamber connected to said first tank near the top thereof, a riser pipe connected to said first tank terminating in said first surge chamber above the top of said first tank, a second closed top storage tank, a second surge chamber connected to said second tank near the top thereof, a riser pipe connected to said second tank terminating in said second chamber above the top of said second tank, a conduit leading from the bottom of said first surge chamber into the bottom of said second tank, a conduit leading from the bottom of said second surge chamber into the bottom of said first tank, whereby liquid discharged into one surge chamber flows by gravity into the storage tank associated with the other surge chamber without substantial free fall and valved inlet and outlet means at the bottom of each of said tanks.

References Cited in the file of this patent
UNITED STATES PATENTS

| | | |
|---|---|---|
| 1,210,578 | Willmann | Jan. 2, 1917 |
| 1,325,800 | Pfouts | Dec. 23, 1919 |
| 2,779,351 | Levine | Jan. 29, 1957 |